(12) United States Patent
Hsueh

(10) Patent No.: US 6,182,978 B1
(45) Date of Patent: Feb. 6, 2001

(54) SELF LOCKING DEVICE FOR POWER TOOL

(76) Inventor: Chun Chu Hsueh, P.O. Box 63-99, 406 Taichung (TW)

( * ) Notice: Under 35 U.S.C. 154(b), the term of this patent shall be extended for 0 days.

(21) Appl. No.: 09/373,221

(22) Filed: Aug. 11, 1999

(51) Int. Cl.[7] .................................................. B23B 31/12
(52) U.S. Cl. ............................ 279/62; 279/902; 408/240
(58) Field of Search ............................... 279/60–65, 140, 279/150, 902; 408/240

(56) References Cited

U.S. PATENT DOCUMENTS

| | | | |
|---|---|---|---|
| 3,807,745 | * 4/1974 | Bent | 279/60 |
| 4,381,116 | * 4/1983 | Futter | 279/62 |
| 4,840,387 | * 6/1989 | McCarthy | 279/61 |
| 4,951,955 | * 8/1990 | Sakamaki | 279/62 |
| 5,615,899 | * 4/1997 | Sakamaki | 279/62 |
| 5,988,653 | * 11/1999 | Kuo | 279/62 |
| 5,992,859 | * 11/1999 | Lin | 279/62 |

* cited by examiner

Primary Examiner—Steven C. Bishop

(57) ABSTRACT

A self locking device for a power tool includes a cylindrical member for receiving a tool member, three or more pawls slidably engaged into the cylindrical member to engage with the tool member and each having a threaded surface, a barrel threaded with the threaded surfaces of the pawls and having one or more teeth extended from one end. A ferrule is rotatably engaged on the barrel and may be forced toward the barrel to hold the barrel in place for allowing the pawls to be rotated relative to the barrel to engage with the tool member when the barrel is secured to the ferrule.

8 Claims, 11 Drawing Sheets

SELF LOCKING DEVICE FOR POWER TOOL

BACKGROUND OF THE INVENTION

1. Field of the Invention

The present invention relates to a locking device, and more particularly to a self locking device for a power tool.

2. Description of the Prior Art

Typical power tools comprise a chuck for securing the tool members, such as the screw driver bits, the drill gimlets, or the wrench tools. The power tools include a control ferrule that is required to be rotated to secure the tool members to the power tool manually. In addition, an additional locking tool is required to further solidly secure the tool members to the power tool.

The present invention has arisen to mitigate and/or obviate the afore-described disadvantages of the conventional locking devices for power tools.

SUMMARY OF THE INVENTION

The primary objective of the present invention is to provide a power tool having a self locking device for locking the tool member to the power tool.

In accordance with one aspect of the invention, there is provided a self locking device for a power tool comprising a body for securing to and for being driven by the power tool, the body including a bore formed therein for receiving a tool member to be driven by the power tool and including at least three channels formed therein and communicating with the bore thereof, at least three pawls slidably engaged in the channels of the body for engaging with the tool member, the pawls each including a threaded surface formed therein, a barrel including an inner thread formed therein and threading with the threaded surfaces of the pawls, the barrel including a first end having at least one tooth extended therefrom, a ferrule rotatably engaged on the barrel and including at least one tooth extended therefrom for engaging with the tooth of the barrel and for securing the barrel to the ferrule, and means for biasing the ferrule away from the first end of the barrel to disengage the tooth of the ferrule from the tooth of the barrel. The pawls are rotated relative to the barrel to engage with the tool member when the barrel is secured to the ferrule.

The ferrule includes an annular shoulder formed therein and having the tooth extended downward from the annular shoulder thereof, the tooth of the barrel is extended upward from the first end of the barrel to engage with the tooth of the ferrule when the ferrule is forced toward the first end of the barrel against the biasing means.

A securing device is further provided for rotatably securing the ferrule to the barrel. The body includes an annular recess formed therein, the barrel includes at least one aperture formed therein, the rotatably securing device includes at least one ball received in the aperture of the barrel, and a sleeve engaged on the barrel and engaged with the ball for forcing the ball inward the annular recess of the body and for rotatably securing the barrel to the body, the sleeve is engaged with the ferrule for preventing the ferrule from being disengaged from the barrel.

A cover is further rotatably secured onto the body for shielding the pawls. The barrel includes an engaging hole formed therein for engaging with and for driving a fastener. The barrel includes at least one slot formed therein for engaging with a driving tool. The ferrule includes an annular flange extended radially inward therefrom for rotatably engaging with the barrel.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
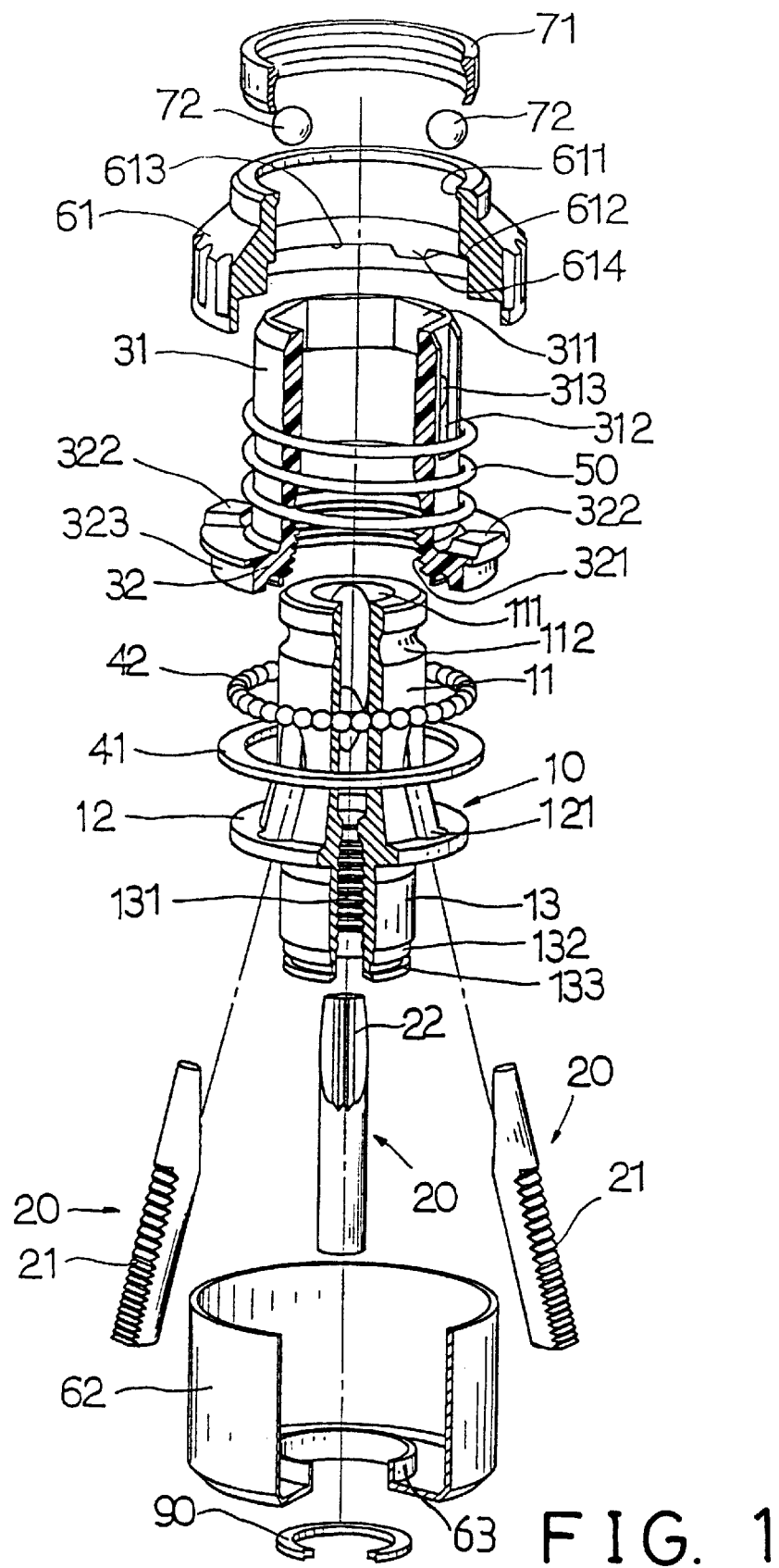
FIG. 1 is an exploded view of a self locking device for a power tool in accordance with the present invention.
Figure 2:
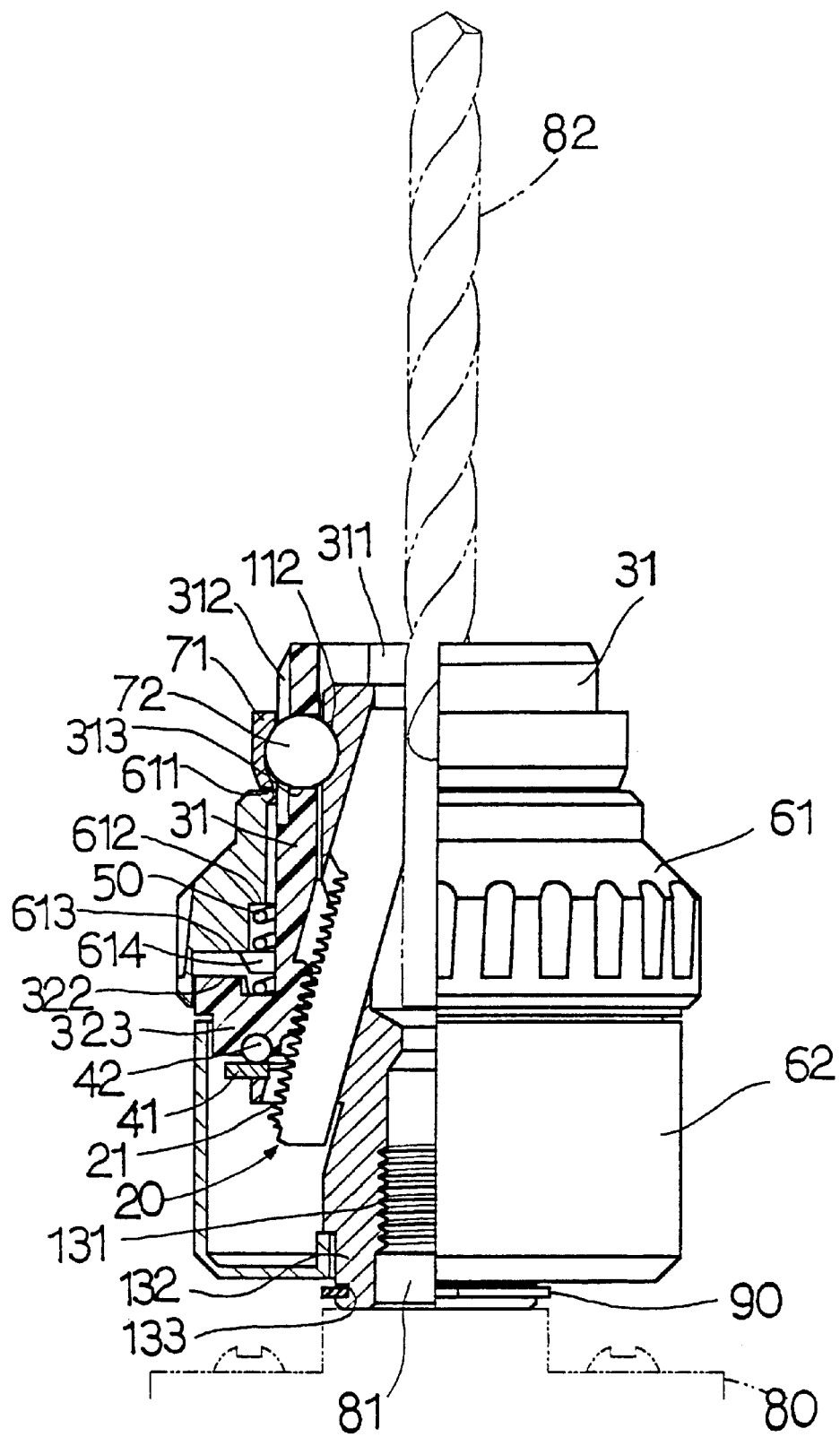
FIGS. 2 and 3 are plane views of the self locking device, in which one half of the self locking device is cut off for showing the inner structure and the operation of the self locking device.
Figure 3:
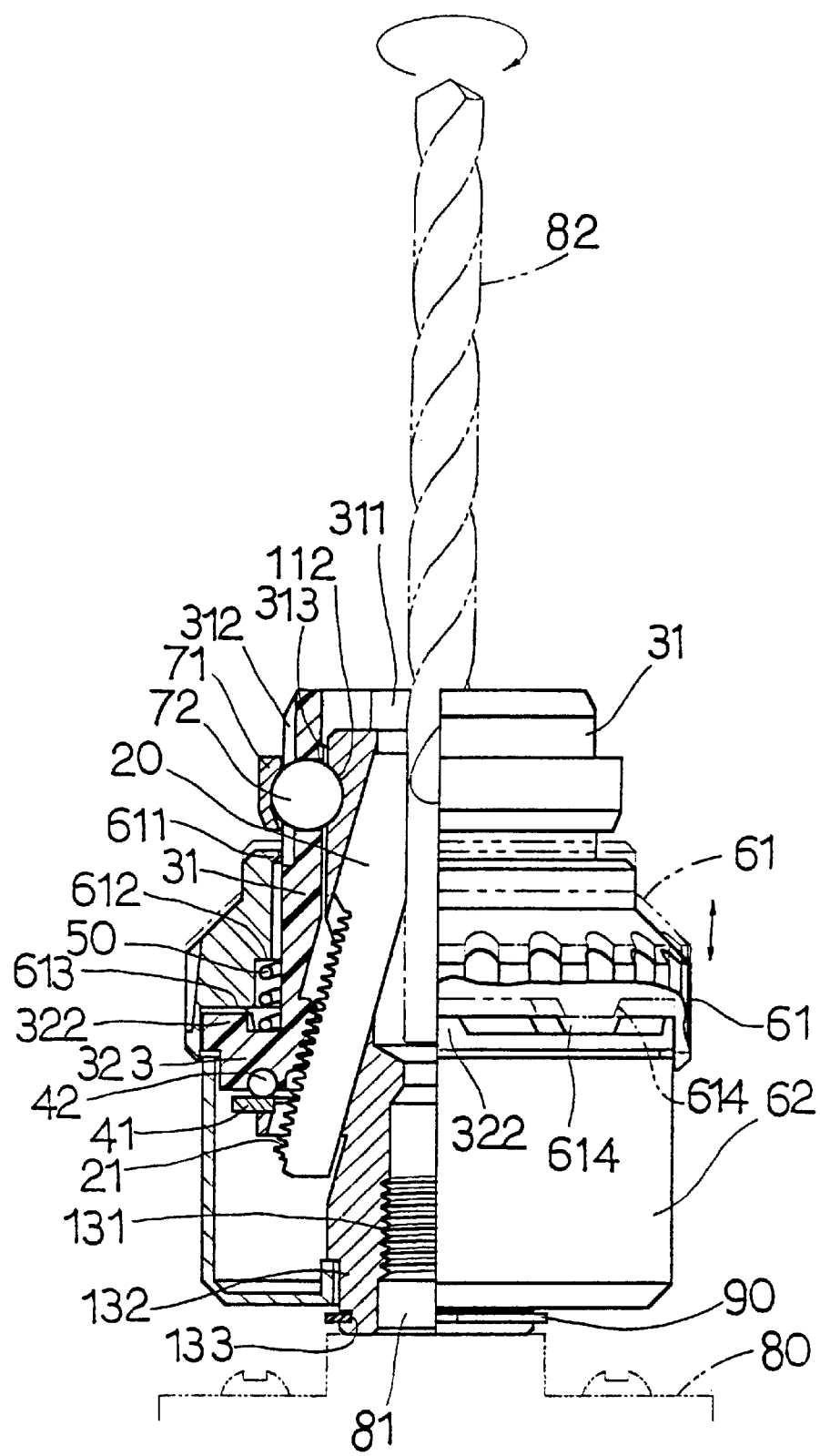

Referring to the drawings, and initially to FIGS. 1–3, a self locking device in accordance with the present invention comprises a body 10 formed by such as a cylindrical member 11 and including a bore 111 formed therein for receiving a tool member 82, particularly the drill bit, and including an inner thread 131 formed in one end or in the lower end 13 thereof for securing to a spindle 81 of a power tool 80 and for being driven by the power tool 80. The lower end 13 of the body 10 further includes an annular shoulder 132 formed therein. The body 10 includes an annular flange 12 extended radially outward from the middle portion and includes three or more channels 121 formed therein for slidably receiving three or more pawls 20 therein respectively. The pawls 20 each includes one end extended inward of the bore 111 of the body 10 and having an engaging surface 22 formed therein for engaging with the tool member 82 and each includes a threaded surface 21 formed in the outer peripheral portion of the other end thereof for threading with an inner thread 321 of a barrel 31. A cover 62 includes a hub 63 rotatably engaged with an annular shoulder 132 of the body 10 and a clamping ring 90 is engaged with an annular groove 133 of the body 10 for rotatably securing the cover 62 to the body 10 and for shielding the pawls 20.

A barrel 31 is rotatably engaged on the body 10 and includes a lower portion 32 having one or more teeth 322, particularly the ratchet teeth, extended upward therefrom and having an annular shoulder 323 formed therein for engaging with the cover 62 and having the inner thread 321 formed therein for threading with that of the pawls 20. A ball bearing includes a gasket 41 and a ball bearing 42 engaged between the annular flange 12 of the body 10 and the lower portion 32 of the barrel 31. A ferrule 61 is rotatably engaged on the barrel 31 and includes an annular flange 611 extended radially inward from the upper end thereof for engaging with the barrel 31 and includes two annular shoulders 612, 613 formed therein, and includes one or more teeth 614 extended downward from the annular shoulder 613 thereof for engaging with the teeth 322 of the barrel 31. A spring 50 is engaged between the annular shoulder 612 of the ferrule 61 and the barrel 31 for disengaging the teeth 614 of the ferrule 61 from the teeth 322 of the barrel 31.

Figure 10:
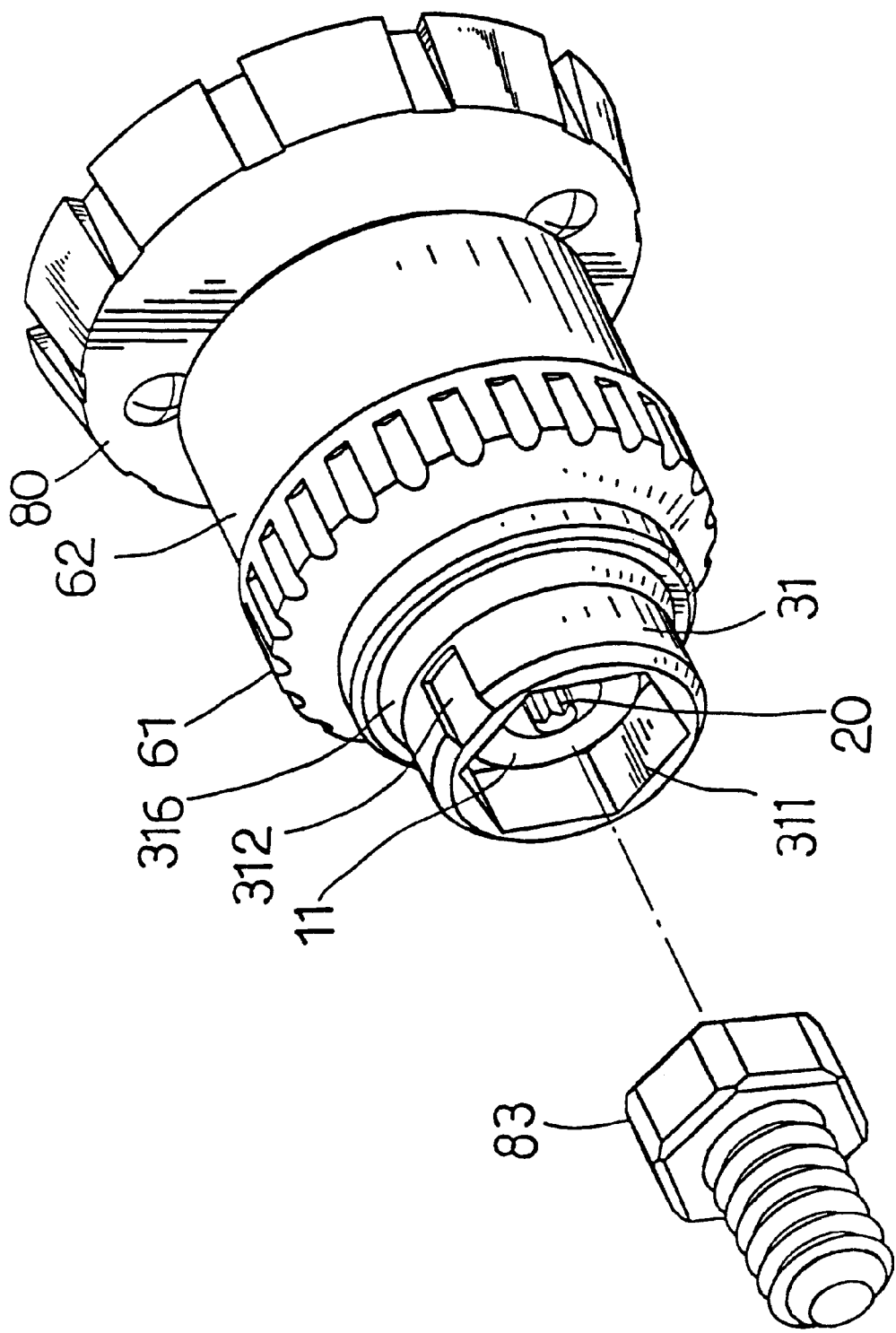
FIG. 10 is a partial exploded view, illustrating the other application of the self locking device.
Figure 11:
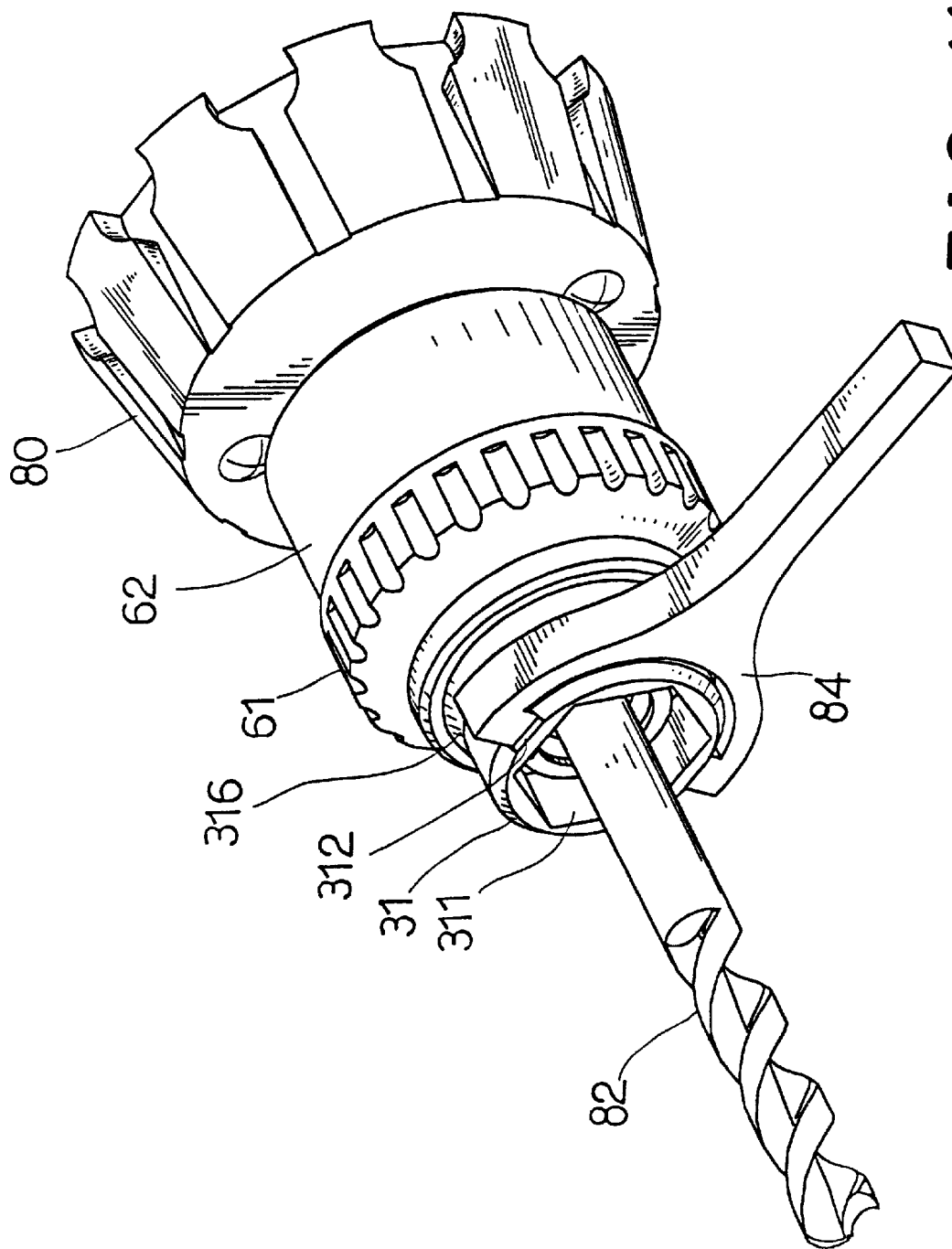
FIG. 11 is a perspective view illustrating the operation of the self locking device.

The barrel 31 includes one or more apertures 313 formed in the upper portion thereof for receiving balls 72 therein respectively and includes an engaging hole 311 formed in the upper end thereof for engaging with and for driving a fastener 83 (FIG. 10), for example. The barrel 31 further includes one or more slots 312 formed in the outer peripheral portion thereof for engaging with a driving tool 84 (FIG. 11) and for allowing the barrel 31 to be rotated relative to the body 10 and the pawls 20 and for allowing the barrel 31 to be threaded to and unthreaded relative to the pawls 20. A sleeve 71 is engaged onto the barrel 31 and engaged with the balls 72 for biasing the balls 72 inward of an annular recess 112 of the body 10 and for rotatably securing the ferrule 61 to the body 10 or for rotatably securing the ferrule 61 to the barrel 31.

The rotation of the body 10 and the pawls 20 relative to the barrel 31 in one direction may force the pawls 20 inward of the body 10 to secure the tool member 82 to the tool member 82, and may disengage the pawls 20 from the tool member 82 to release the tool member 82 when the pawls 20 are rotated in the other direction relative to the barrel 31.

In operation, when the tool member 82 is engaged into the bore 111 of the body 10 and when the body 10 and thus the pawls 20 are driven by the power tool 80 in the active direction, the pawls 20 may be rotated relative to the barrel 31 due to the moment of inertia such that the pawls 20 may be forced to engage with the tool member 82 and to drive the tool member 82 to drive the fasteners. When the pawls 20 are threaded and secured to the barrel 31, the barrel 31 may be rotated in concert with the pawls 20 and may be rotated by the body 10 such that the tool member 82 may be driven by the power tool 80.

When the ferrule 61 is moved against the spring 50 to engage the teeth 614 of the ferrule 61 with the teeth 322 of the barrel 31, the barrel 31 may be retained in place by the ferrule 61 such that the pawls 20 may further be rotated relative to the barrel 31 and such that the pawls 20 may further be threaded relative to the barrel 31 and may thus be further solidly secured to the tool member 82. The tool member 82 may thus be forcedly driven by the power tool. When the pawls 20 are tightened to the tool member 82, the barrel 31 may be secured to the body 10 again and may be rotated by the body 10. The ferrule 61 may then by forced or stricken by the barrel 31 by the engagement between the teeth 614 and 322. Normally, the ferrule 61 will be released after the pawls 20 are tightened to the tool member 82.

Figure 4:
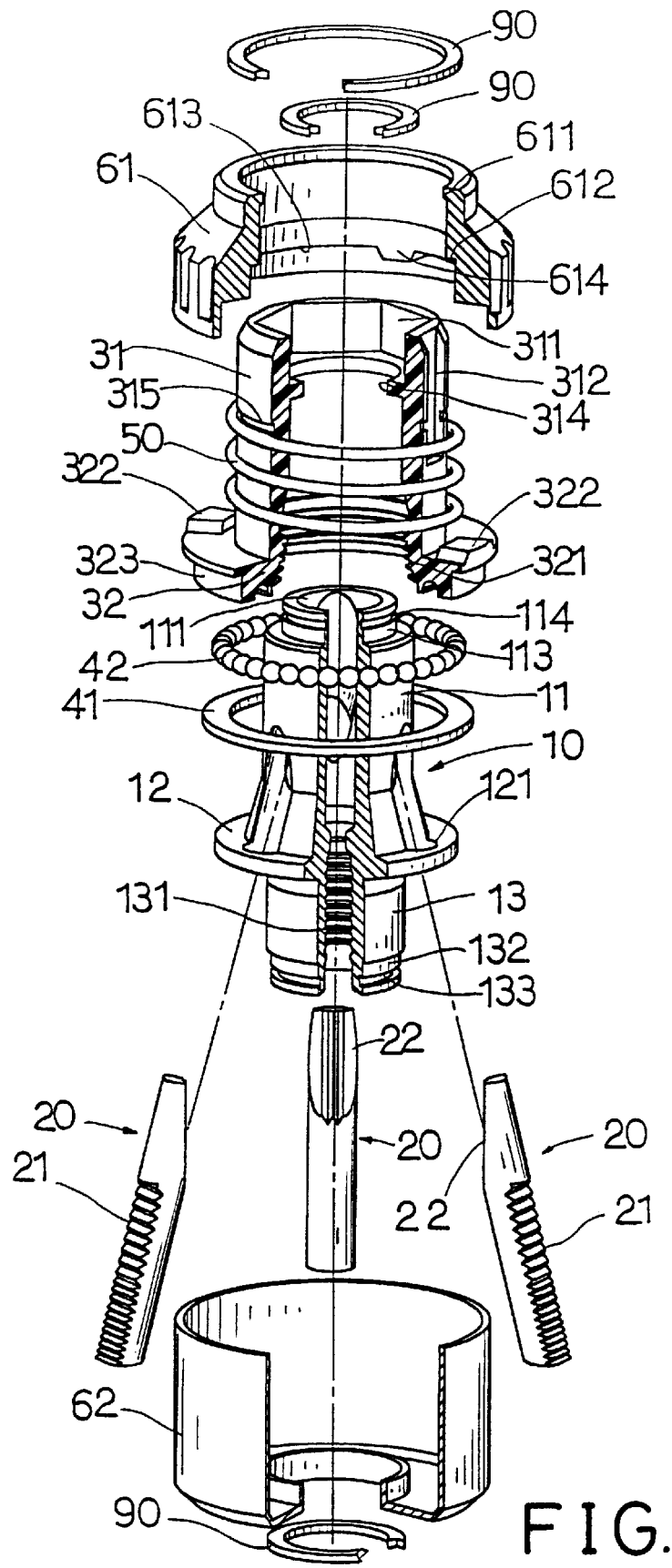
FIG. 4 is an exploded view illustrating another application of the self locking device.
Figure 5:
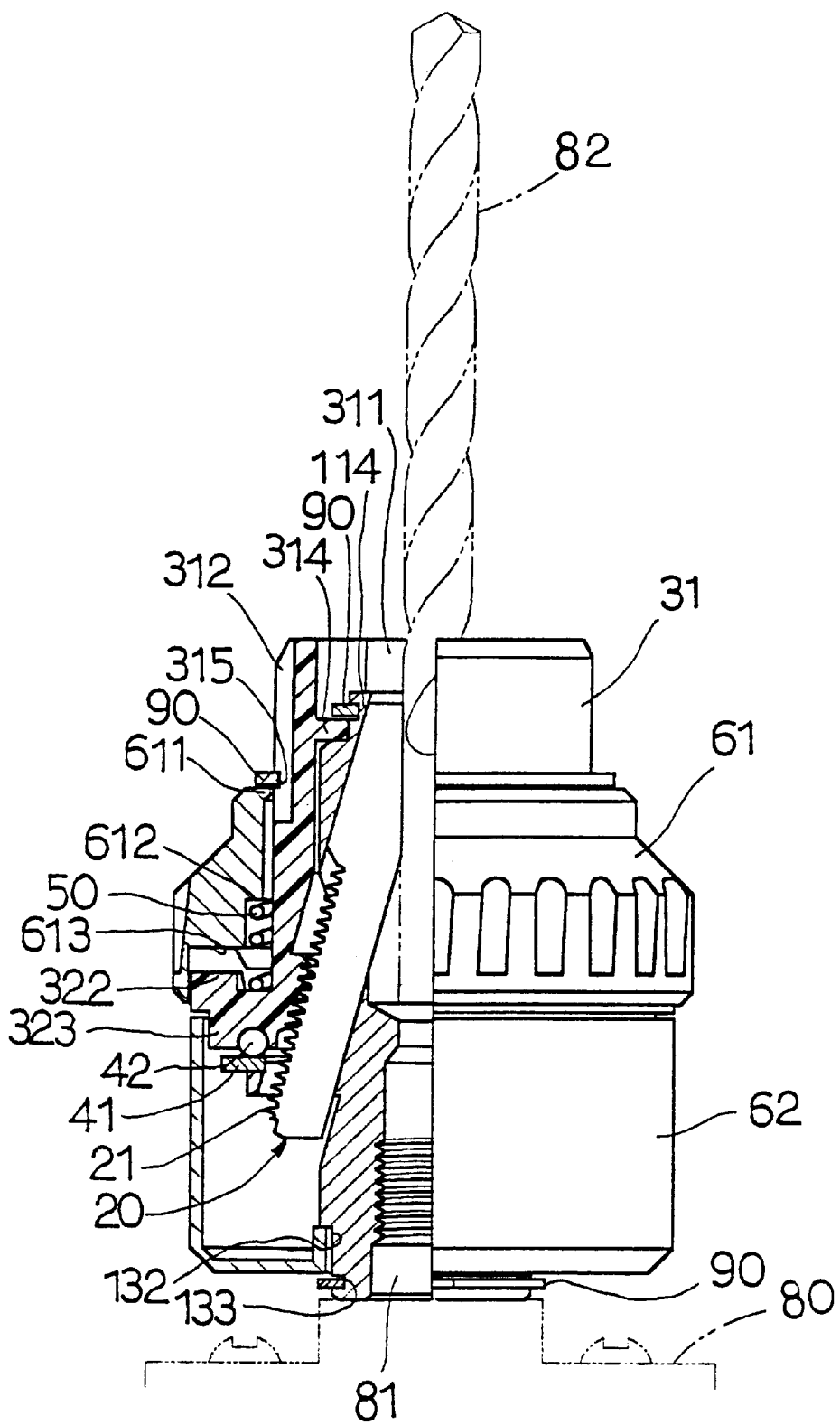
FIGS. 5 and 6 are plane views of the self locking device as shown in FIG. 4, in which one half of the self locking device is cut off for showing the inner structure and the operation of the self locking device.
Figure 6:
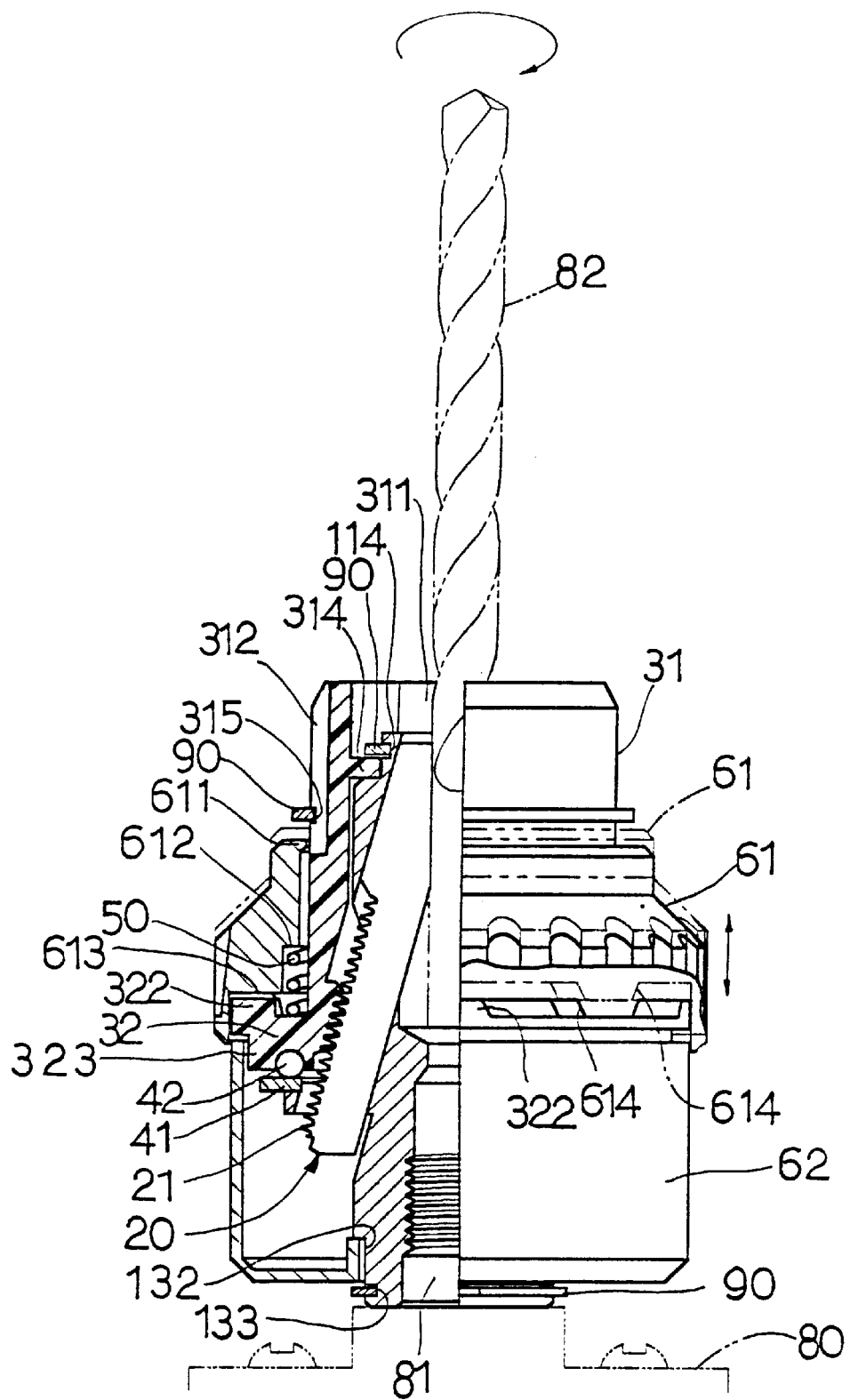

Referring next to FIGS. 4–6, instead of the sleeve 71 and the balls 72, a clamping ring 90 is engaged with an annular depression 315 that is formed in the outer peripheral portion of the barrel 31. The barrel 31 includes an annular rib 314 extended radially inward therefrom and engaged with an annular shoulder 113 that is formed in the upper end of the body 10, and another clamping ring 90 is engaged with an annular recess 114 of the body and engaged with the annular rib 314 of the barrel 31 to rotatably securing the barrel 31 to the body 10 and for preventing the barrel 31 from being disengaged from the body 10.

Figure 7:
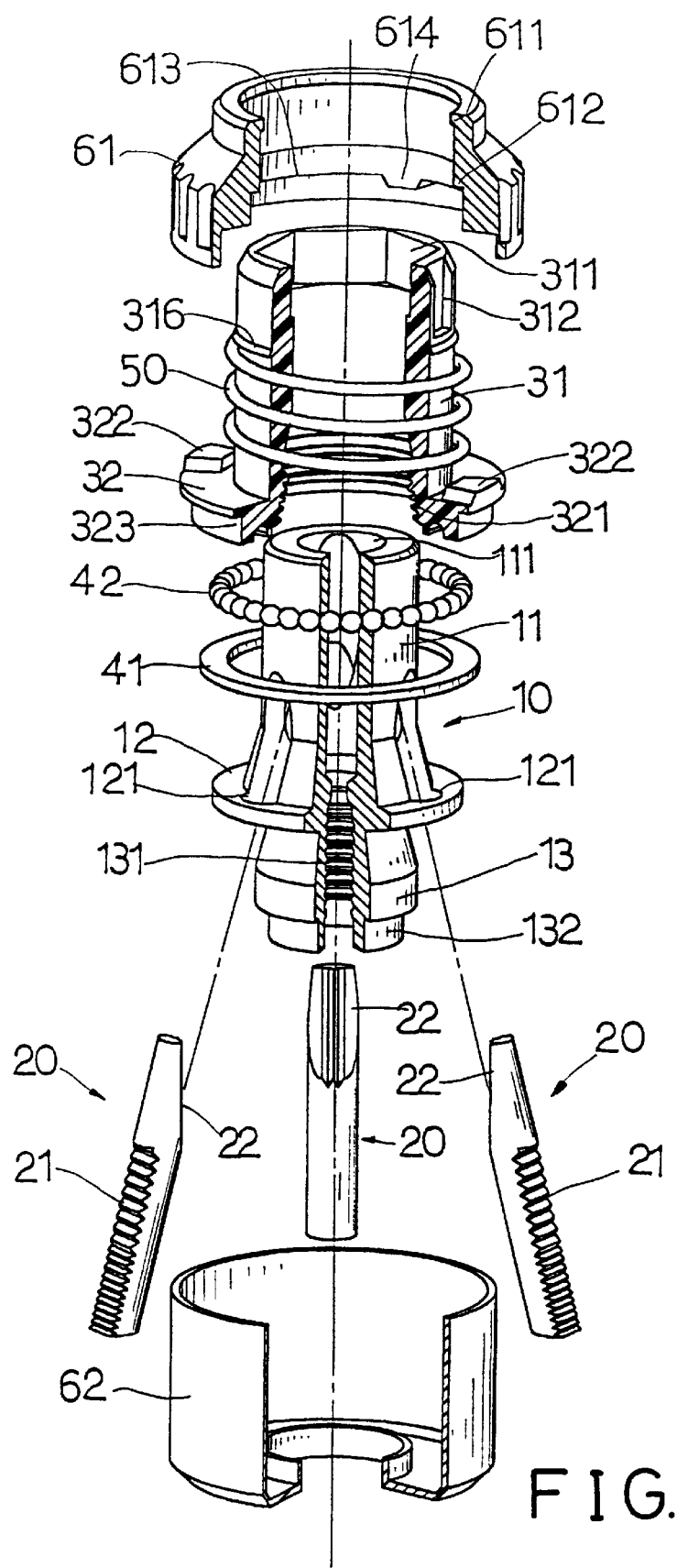
FIG. 7 is an exploded view illustrating a further application of the self locking device.
Figure 8:
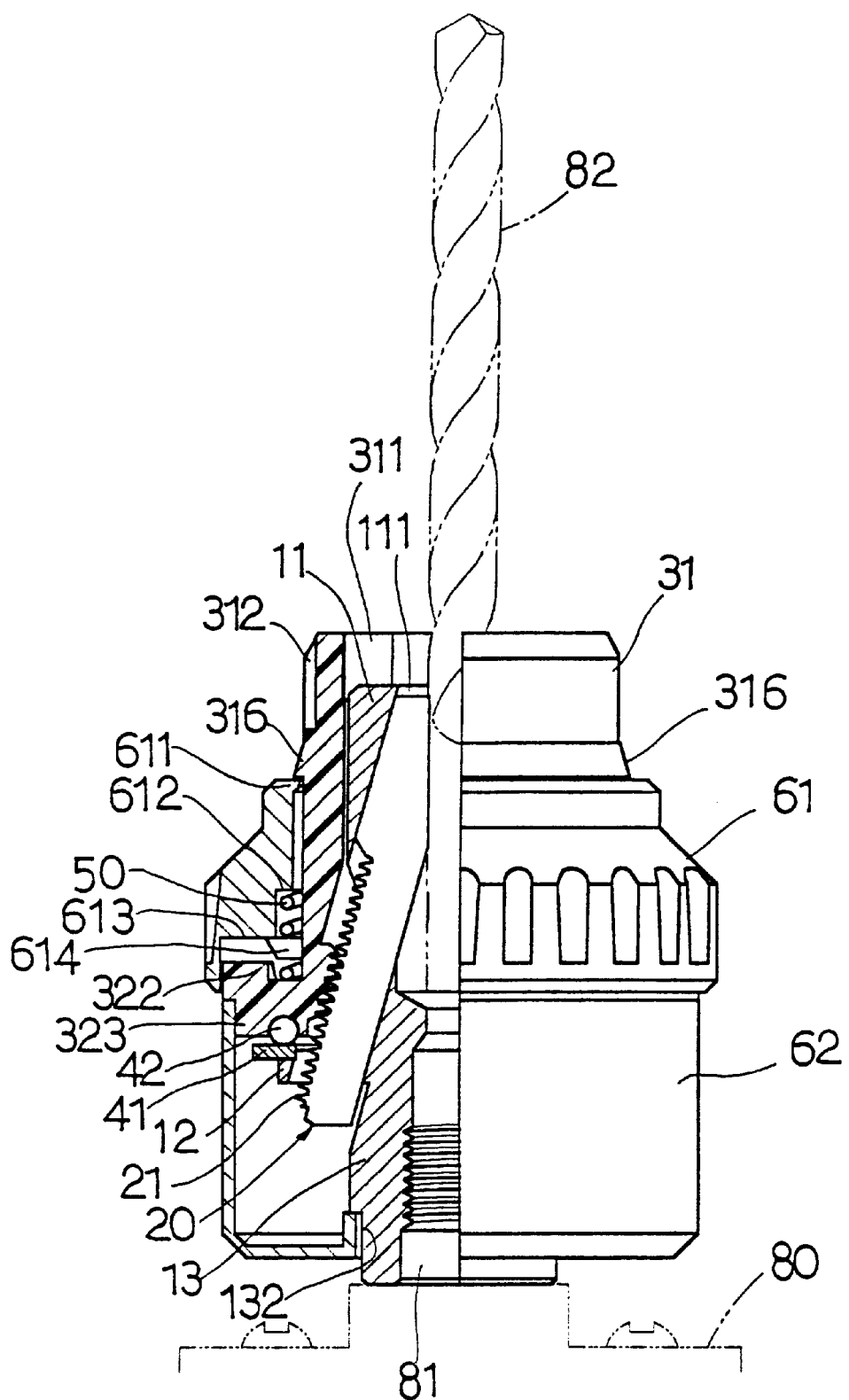
FIGS. 8 and 9 are plane views of the self locking device as shown in FIG. 7, in which one half of the self locking device is cut off for showing the inner structure and the operation of the self locking device.
Figure 9:
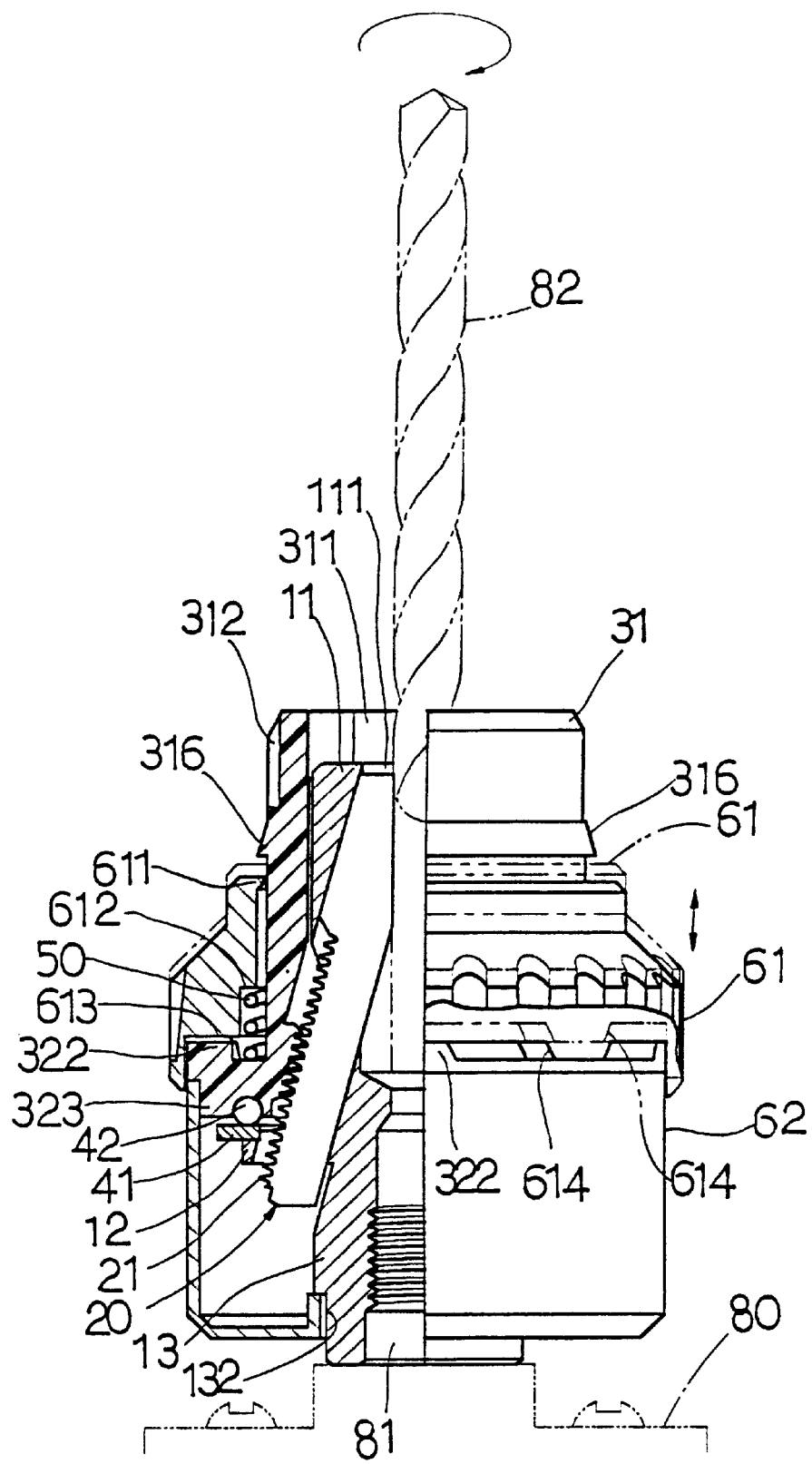

Referring next to FIGS. 7–9, alternatively, the barrel 31 includes an annular ratchet tooth 316 formed on the outer peripheral portion thereof for engaging with the annular flange 611 of the ferrule 61 and for allowing the ferrule 61 to be engaged onto the barrel 31 and for rotatably securing the ferrule 61 to the barrel 31 and for preventing the ferrule 61 from being disengaged from the barrel 31.

Accordingly, the power tool in accordance with the present invention includes a self locking device for locking the tool member to the power tool.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A self locking device for a power tool, said self locking device comprising:

a body for securing to and for being driven by the power tool, said body including a bore formed therein for receiving a tool member to be driven by the power tool and including at least three channels formed therein and communicating with said bore thereof, at least three pawls slidably engaged in said at least three channels of said body for engaging with the tool member, said at least three pawls each including a threaded surface formed therein, a barrel including an inner thread formed therein and threading with said threaded surfaces of said at least three pawls, a ferrule rotatably engaged on said barrel, and means for biasing said ferrule to move relative to said barrel, said at least three pawls being rotated relative to said barrel to engage with the tool member when said ferrule is moved against said biasing means and forced and secured to said barrel, wherein said barrel includes a first end having at least one tooth extended therefrom, said ferrule includes at least one tooth extended therefrom for engaging with said at least one tooth of said barrel and for securing said barrel to said ferrule, said biasing means is provided for disengaging said at least one tooth of said ferrule from said at least one tooth of said barrel.

2. The self locking device according to claim 1, wherein said ferrule includes an annular shoulder formed therein and having said at least one tooth extended downward from said annular shoulder thereof, said at least one tooth of said barrel is extended upward from said first end of said barrel to engage with said at least one tooth of said ferrule when said ferrule is forced toward said first end of said barrel against said biasing means.

3. The self locking device according to claim 1 further comprising means for rotatably securing said ferrule to said barrel.

4. A self locking device for a power tool, said self locking device comprising:

a body for securing to and for being driven by the power tool, said body including a bore formed therein for receiving a tool member to be driven by the power tool and including at least three channels formed therein and communicating with said bore thereof, at least three pawls slidably engaged in said at least three channels of said body for engaging with the tool member, said at least three pawls each including a threaded surface formed therein, a barrel including an inner thread formed therein and threading with said threaded surfaces of said at least three pawls, a ferrule rotatable engaged on said barrel, means for biasing said ferrule to move relative to said barrel, said at least three pawls being rotated relative to said barrel to engage with the tool member when said ferrule is moved against said biasing means and forced and secured to said barrel, and means for rotatably securing said ferrule to said barrel, wherein said body includes an annular recess formed therein, said barrel includes at least one aperture formed therein, said rotatably securing means includes at least one ball received in said at least one aperture of said barrel, and a sleeve engaged on said barrel and engaged with said at least one ball for forcing said at least one ball inward said annular recess of said body and for rotatably securing said barrel to said body, said sleeve is engaged with said ferrule for preventing said ferrule from being disengaged from said barrel.

5. A self locking device for a power tool, said self locking device comprising:

a body for securing to and for being driven by the power tool, said body including a bore formed therein for receiving a tool member to be driven by the power tool and including at least three channels formed therein and communicating with said bore thereof, at least three pawls slidably engaged in said at least three channels of said body for engaging with the tool member, said at least three pawls each including a threaded surface formed therein, a barrel including an inner thread formed therein and threading with said threaded surfaces of said at least three pawls, a ferrule rotatable engaged on said barrel, means for biasing said ferrule to move relative to said barrel, said at least three pawls being rotated relative to said barrel to engage with the tool member when said ferrule is moved against said biasing means and forced and secured to said barrel, and a cover rotatably secured onto said body for shielding said pawls.

6. A self locking device for a power tool, said self locking device comprising:

a body for securing to and for being driven by the power tool, said body including a bore formed therein for receiving a tool member to be driven by the power tool and including at least three channels formed therein and communicating with said bore thereof, at least three pawls slidably engaged in said at least three channels of said body for engaging with the tool member, said at least three bawls each including a threaded surface formed therein, a barrel including an inner thread formed therein and threading with said threaded surfaces of said at least three pawls, a ferrule rotatable engaged on said barrel, and means for biasing said ferrule to move relative to said barrel, said at least three pawls being rotated relative to said barrel to engage with the tool member when said ferrule is moved against said biasing means and forced and secured to said barrel, wherein said barrel includes an engaging hole formed therein for engaging with and for driving a fastener.

7. A self locking device for a power tool, said self locking device comprising:

a body for securing to and for being driven by the power tool, said body including a bore formed therein for receiving a tool member to be driven by the power tool and including at least three channels formed therein and communicating with said bore thereof, at least three bawls slidably engaged in said at least three channels of said body for engaging with the tool member, said at least three pawls each including a threaded surface formed therein, a barrel including an inner thread formed therein and threading with said threaded surfaces of said at least three pawls, a ferrule rotatable engaged on said barrel, and means for biasing said ferrule to move relative to said barrel, said at least three pawls being rotated relative to said barrel to engage with the tool member when said ferrule is moved against said biasing means and forced and secured to said barrel, wherein said barrel includes at least one slot formed therein for engaging with a driving tool.

8. A self locking device for a power tool, said self locking device comprising:

a body for securing to and for being driven by the power tool, said body including a bore formed therein for receiving a tool member to be driven by the power tool and including at least three channels formed therein and communicating with said bore thereof, at least three pawls slidablv engaged in said at least three channels of said body for engaging with the tool member, said at least three pawls each including a threaded surface formed therein, a barrel including an inner thread formed therein and threading with said threaded surfaces of said at least three pawls, a ferrule rotatable engaged on said barrel, and means for biasing said ferrule to move relative to said barrel, said at least three pawls being rotated relative to said barrel to engage with the tool member when said ferrule is moved against said biasing means and forced and secured to said barrel, wherein said ferrule includes an annular flange extended radially inward therefrom for rotatably engaging with said barrel.

* * * * *